(12) United States Patent
Pahrmann

(10) Patent No.: US 12,181,488 B2
(45) Date of Patent: *Dec. 31, 2024

(54) ATTACHABLE WIND DETECTION DEVICE

(71) Applicant: John Pahrmann, Poulsbo, WA (US)

(72) Inventor: John Pahrmann, Poulsbo, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/365,959

(22) Filed: Oct. 26, 2023

(65) Prior Publication Data

US 2024/0061008 A1 Feb. 22, 2024

Related U.S. Application Data

(63) Continuation of application No. 17/461,905, filed on Aug. 30, 2021, now Pat. No. 11,733,261, which is a continuation of application No. 17/376,648, filed on Jul. 15, 2021, now abandoned, which is a continuation of application No. 17/315,923, filed on May 10, 2021, now abandoned, which is a continuation of application No. 17/183,296, filed on Feb. 23, 2021, now abandoned, which is a continuation of application No. 16/723,739, filed on Dec. 20, 2019, now Pat. No. 10,928,415, which is a continuation-in-part of application No. 16/139,822, filed on Sep. 24, 2018, now Pat. No. 10,514,388.

(Continued)

(51) Int. Cl.
| | |
|---|---|
| *G01P 13/02* | (2006.01) |
| *A01M 31/00* | (2006.01) |
| *A61J 9/04* | (2006.01) |
| *B05B 11/06* | (2006.01) |
| *F41B 5/14* | (2006.01) |
| *F41G 3/08* | (2006.01) |
| *G01P 13/00* | (2006.01) |

(52) U.S. Cl.
CPC ............. *G01P 13/02* (2013.01); *F41G 3/08* (2013.01); *G01P 13/0006* (2013.01); *A01M 31/00* (2013.01); *A01M 31/008* (2013.01); *A61J 9/04* (2013.01); *B05B 11/06* (2013.01); *B05B 11/062* (2013.01); *F41B 5/148* (2013.01); *G01P 13/0093* (2013.01)

(58) Field of Classification Search
CPC .. G01P 13/02; G01P 13/0006; G01P 13/0093; F41G 3/08; A01M 31/00; A01M 31/008; A61J 9/04; B05B 11/06; B05B 11/062; F41B 5/148
See application file for complete search history.

(56) References Cited

U.S. PATENT DOCUMENTS

| | | | | |
|---|---|---|---|---|
| 2,580,580 A | * | 1/1952 | Nicolle ............... | B05B 11/0059 222/211 |
| 4,423,626 A | * | 1/1984 | Herschede ............ | A01M 31/00 73/170.04 |
| 5,520,164 A | | 5/1996 | Huddleston | |

(Continued)

*Primary Examiner* — John Fitzgerald
*Assistant Examiner* — Tania Courson
(74) *Attorney, Agent, or Firm* — Boon Intellectual Property Law, PLLC; Brian S. Boon

(57) ABSTRACT

A wind detection device with a flexible enclosure, and opening, and a dispensing tube, filled with powder or liquid and designed to be attached to hunting equipment, headgear, or clothing, wherein pressing on the outside of the device causes a puff of powder or vapor to be dispensed into the air, allowing the user to determine wind direction.

2 Claims, 7 Drawing Sheets

Related U.S. Application Data which is a continuation-in-part of application No. 16/045,664, filed on Jul. 25, 2018, now abandoned.

(60) Provisional application No. 62/898,982, filed on Sep. 11, 2019, provisional application No. 62/536,952, filed on Jul. 25, 2017.

(56) References Cited

U.S. PATENT DOCUMENTS

| | | | | |
|---|---|---|---|---|
| 5,958,585 | A * | 9/1999 | Meeks | G01P 13/02 428/394 |
| 6,550,418 | B2 * | 4/2003 | Williamson | G01P 13/02 73/170.04 |
| 6,742,723 | B2 | 6/2004 | Felegy | |
| 6,810,614 | B2 | 11/2004 | Phillips et al. | |
| 9,063,166 | B1 * | 6/2015 | Burklow | G01P 13/02 |
| 11,029,325 | B2 * | 6/2021 | D'Acquisto | G01P 13/02 |
| 11,140,895 | B2 * | 10/2021 | Wynalda, Jr. | A01M 31/008 |

* cited by examiner

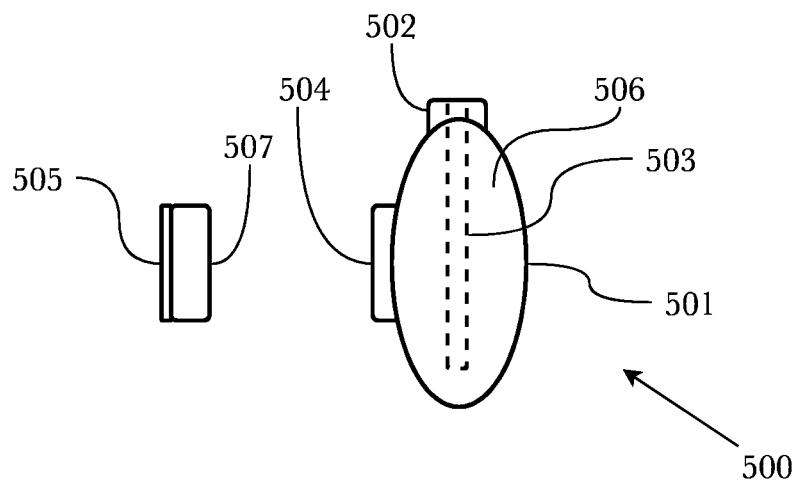
Fig. 5A (side view)
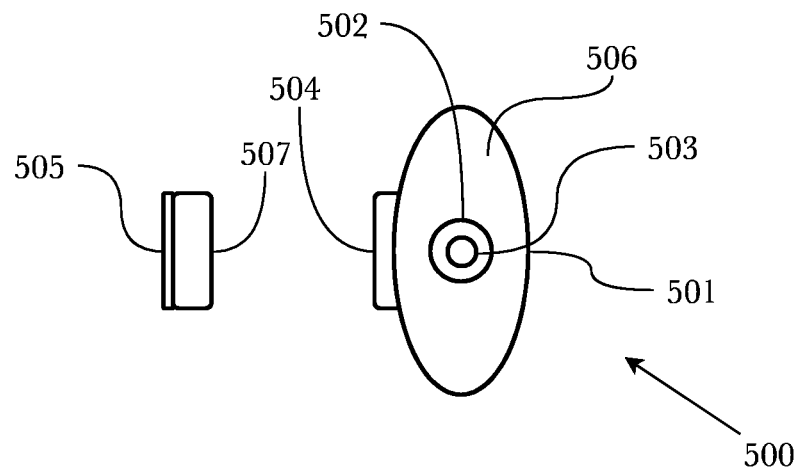
Fig. 5B (top view)
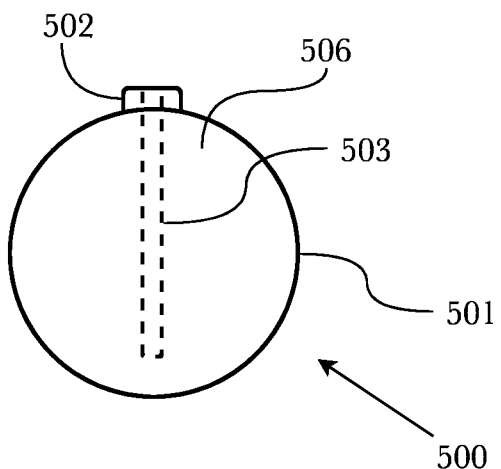
Fig. 5C (front view)

ATTACHABLE WIND DETECTION DEVICE

CROSS-REFERENCE TO RELATED APPLICATIONS

Priority is claimed in the application data sheet to the following patents or patent applications, the entire written description of each of which is expressly incorporated herein by reference in its entirety:
Ser. No. 17/461,905
Ser. No. 17/376,648
Ser. No. 17/315,923
Ser. No. 17/183,296
Ser. No. 16/723,739
62/898,982
Ser. No. 16/139,822
Ser. No. 16/045,664
62/536,952

BACKGROUND OF THE INVENTION

Field of the Art

The disclosure relates to the field of wind detection in hunting, and more particularly to a hands-free, attachable wind detection device for bow hunting.

Discussion of the State of the Art

In the field of hunting, hunters often spend hours or days tracking their prey forgoing modern luxuries such as running toilets, showers, clean shaves, or fresh laundry. This generally leads to a very dirty and smelly hunter tracking an animal such as deer, which is a very scent-sensitive creature. Wind direction can make or break a hunt; if a smelly hunter is positioned upwind of his prey, his scent can tip off his prey and run away thus ending a long hunting trip with no reward.

Hunters then have a need for wind speed and direction detection without removing their hands from their hunting equipment (e.g., bow, rifle). Common wind detectors are a simple squeeze bottle with talcum powder that can be kept in the hunters' pockets. This remedy requires the hunter to remove his hand from the hunting equipment, reach into the pocket, grab the bottle, pull it out of the pocket, squeeze it, and then place the bottle back into the pocket before he places his hand back on his hunting equipment. Any one of these movements can spook the prey and end the hunt with no reward.

What is needed, is a means to provide a wind detection device that attaches directly to a piece of hunting equipment, headgear, or clothing and remains attached, thus eliminating the need for a hunter to take his hands off the hunting equipment while checking for wind direction, as well as eliminating any unnecessary movements that could scare off the prey.

SUMMARY OF THE INVENTION

Accordingly, the inventor has conceived and reduced to practice, in a preferred embodiment of the invention, a device for an attachable wind detector that affixes directly to a hunting equipment removing need for unnecessary hand movements.

According to a preferred embodiment, a wind detection device is disclosed, comprising: an enclosure comprising an interior cavity, a flexible wall, and a mounting structure; an opening in the enclosure configured to allow insertion and retention of a dispensing tube; a dispensing tube inserted into and retained in the opening, the dispensing tube having a first and a second end, with the first end extending through the opening into the interior cavity, and with a longitudinal hole extending the length of the dispensing tube from the first end to the second end; and a mounting receiver configured to be attached to an object, and configured to receive and hold the mounting structure on the enclosure; wherein, when a particulate substance is contained within the interior cavity, pressure on the exterior of the enclosure causes air in the interior cavity to be compressed, forcing a mixture of air and particulate matter from the interior cavity into the first end of the dispensing tube and out of the second end of the dispensing tube.

According to an aspect of an embodiment, the object to which the mounting receiver is attached is a piece of hunting equipment.

According to an aspect of an embodiment, the piece of hunting equipment is a bow.

According to an aspect of an embodiment, the piece of hunting equipment is a rifle.

According to an aspect of an embodiment, the object to which the mounting receiver is attached is a piece of headgear or a piece of clothing.

According to an aspect of an embodiment, the mounting receiver is attached to the object using an adhesive.

According to an aspect of an embodiment, the object is made at least partly of a ferrous metal, and the mounting receiver is attached to the ferrous metal portion of the object using a magnet.

According to an aspect of an embodiment, the object is a piece of headgear or clothing, and the mounting receiver is attached to the object using two magnets, one magnet of a first polarity on the mounting receiver on the outside of the object and one magnet of the opposite polarity on the inside of the object.

According to an aspect of an embodiment, the mounting structure comprises a hook or post, and the mounting receiver comprises a hole into which the hook or post may be placed.

According to an aspect of an embodiment, the mounting structure comprises a clip, and the mounting receiver comprises a slot into which, or through which, the clip may be inserted.

According to an aspect of an embodiment, the mounting structure comprises one component of a hook and loop fabric, and the mounting receiver comprises the other component of a hook and loop fabric.

According to an aspect of an embodiment, the mounting structure comprises a magnet of a first polarity, and the mounting receiver comprises a magnet of the opposite polarity.

According to an aspect of an embodiment, the mounting structure comprises either the male or female portion of a threaded screw attachment, and the mounting receiver comprises the opposite portion of a threaded screw attachment.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

FIGS. 5A-5C are illustrations of a preferred embodiment having a circular frontal cross-section, an ovular side cross-section, and showing a mounting structure and mounting receiver.

DETAILED DESCRIPTION OF THE INVENTION

Detailed Description of Exemplary Embodiments

Figure 1:
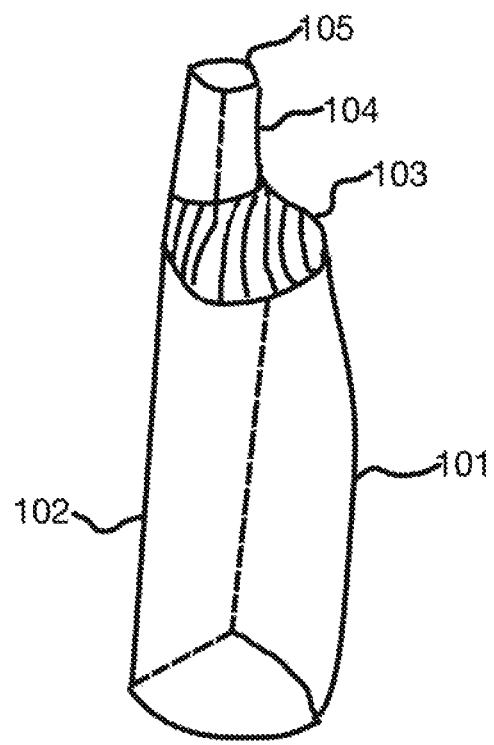
FIG. 1 is an illustration of an exemplary wind detection device according to a preferred embodiment of the invention, illustrating device design for attachment.

FIG. 1 is an illustration of an exemplary wind detection device according to a preferred embodiment of the invention, illustrating device design for attachment 100.

According to the embodiment, a wind detection device 100 may comprise a generally bisected cylindrical-type shape 101 (generally, a bisected cylindrical-type shape to be assembled as illustrated; however, it should be appreciated that other final shapes may be used according to a desired arrangement or use case, such as an elliptical-type shape, or an oval-type shape, or a circular-type shape, or other arrangement) with flat face 102 along the bisection for attachment to surfaces such as a hunting bow (however, it should be appreciated that device may attach to other surfaces such as longbows, recurve bows, compound bows, crossbows, guns such as rifles for rifle hunting, or string spools for kite flying, hat or visor or other devices according to a preferred arrangement or use case). Wind detection device 100 may have opaque, semi-translucent, or translucent walls 101, 102 formed of an impermeable material such as plastic (however, it should be appreciated that other materials may be used to form device walls such as (PP) Polyhigh-density polyethylene (HDPE), low-density polyethylene (LDPE), post-consumer resin (PCR), or plastic-like substances such as silicone, or polyesters such as polyethylene terephthalate (PET), or other materials according to a preferred arrangement or use case); formed where one end of device 100 narrows down to form an opening (mouth) where a lid 103 may attach to and subsequently seal device 100; and where lid 103 narrows down further to another cylindrical-type shape or conical-type shape 104 with another, smaller opening (mouth) 105 for detector contents of device to exit through when device 100 is in use. It should be noted the entire enclosure does not need to be made of the same material. In some embodiments, the enclosure will be made of a combination of materials. In some embodiments, the enclosure will be made of a combination of rigid and flexible materials. For example, in some embodiments, the enclosure may be box-shaped with one flexible wall. In other embodiments, the enclosure may have flexible sidewalls like an accordion or a bellows.

Figure 2:
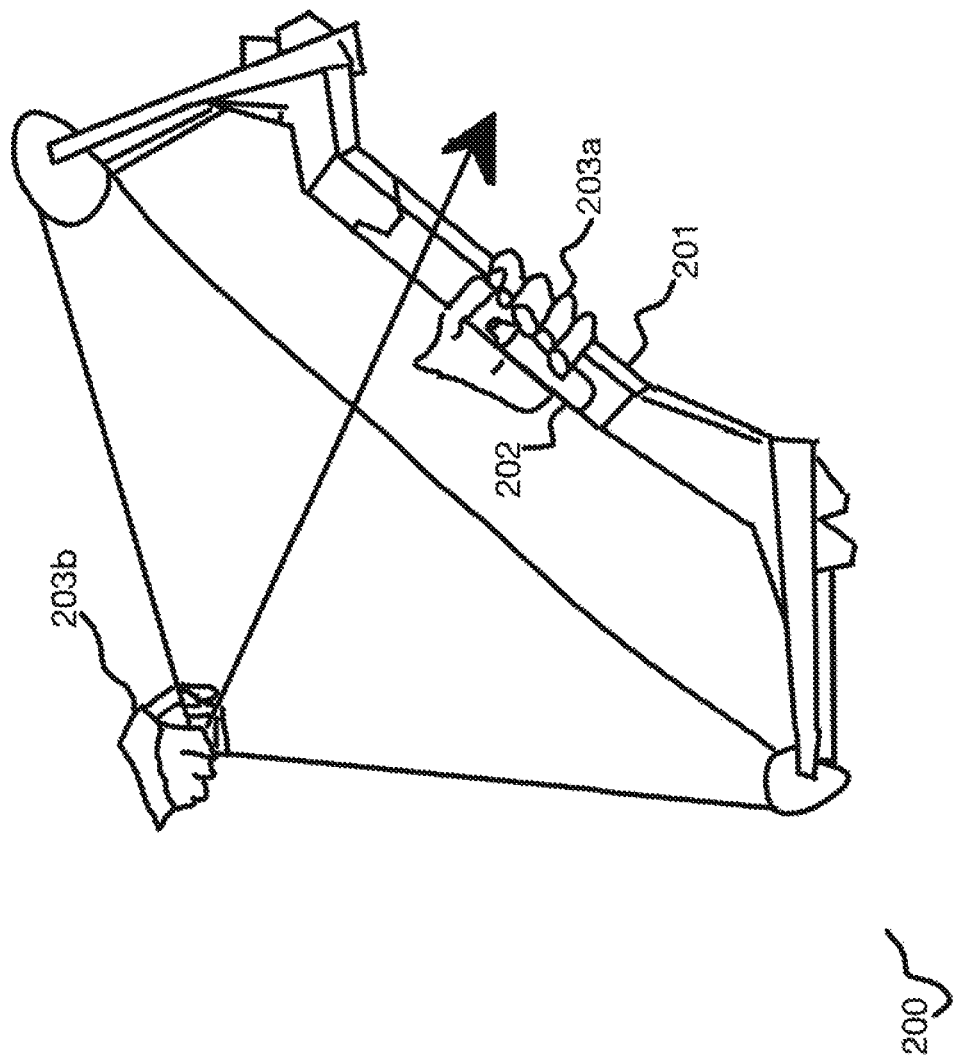
FIG. 2 is an illustration of an exemplary wind detection device according to a preferred embodiment of the invention, illustrating a hunting bow with wind detection device attached.

FIG. 2 is an illustration of an exemplary wind detection device according to a preferred embodiment of the invention, illustrating a hunting bow 200 with wind detection device attached. According to the embodiment, wind detection device 202 attaches directly to hunting bow 201 via an adhesive-type substance such as heavy-duty, double-sided tape (however, it should be appreciated that other adhesive substances may be used such glues, resins, strip adhesives, or other adhesives according to a preferred arrangement or use case). Adhesive is placed between desired surface location of hunting bow 201 and bisected flat surface 102 of device 202. Device 202 may be placed anywhere on hunting bow 201 according to a desired arrangement or use case of the embodiment; if device 202 is attached to hunting bow 201 near grip where hand 203a holds hunting bow 201, then hand 203a may tap or press device 202 to release detector contents such as talcum powder (generally talcum powder is used for wind detection; however, it should be appreciated that other detector contents may be used inside device such as construction chalk, baking powder, corn starch, milkweed seed pods, or micro-balloons, or other contents according to a preferred arrangement or use case), and thereby preventing the need for hand 203a to be removed from hunting bow 201 to retrieve device 202 from within hunter's pockets or bag. Attaching device 202 to hunting bow 201 also prevents need to remove hand 203b from string of hunting bow 201 which also prevents the need to reset any parts of hunting bow 201 (such as resetting an arrow).

Figure 3:
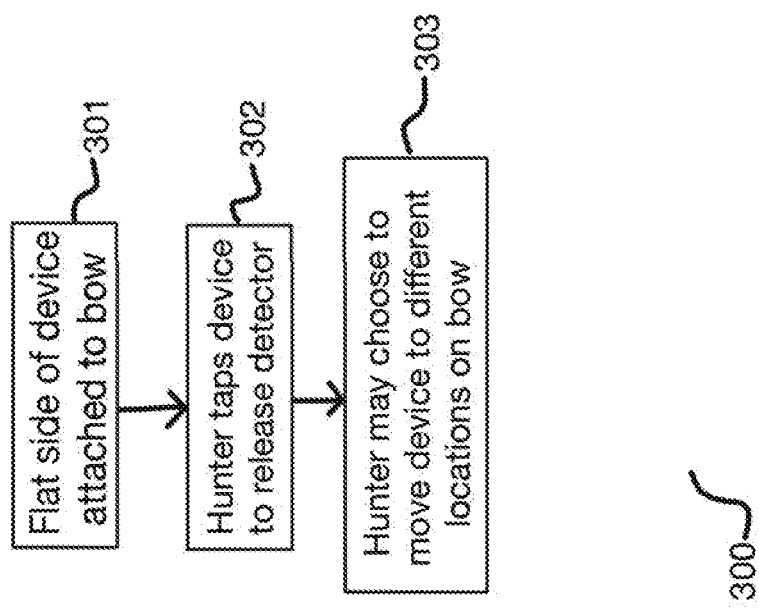
FIG. 3 is an illustration of an exemplary method diagram according to a preferred embodiment of the invention, illustrating use of wind detection device.

FIG. 3 is an illustration of an exemplary method diagram according to a preferred embodiment of the invention, illustrating use 300 of hands-free attachable wind detection device. In a first step, hands-free wind detection device is attached to hunting bow surface 301 along bisected flat side of device with a strong adhesive. In a next step, hunter taps or presses device to release detector contents 302 such as talcum powder into the air for wind detection. Detector contents leave device through a small opening at the top of device and float in direction of wind as well as float with the wind speed. In an optional step, hunter may choose to reattach device 303 to a different position along bow.

Figure 4:
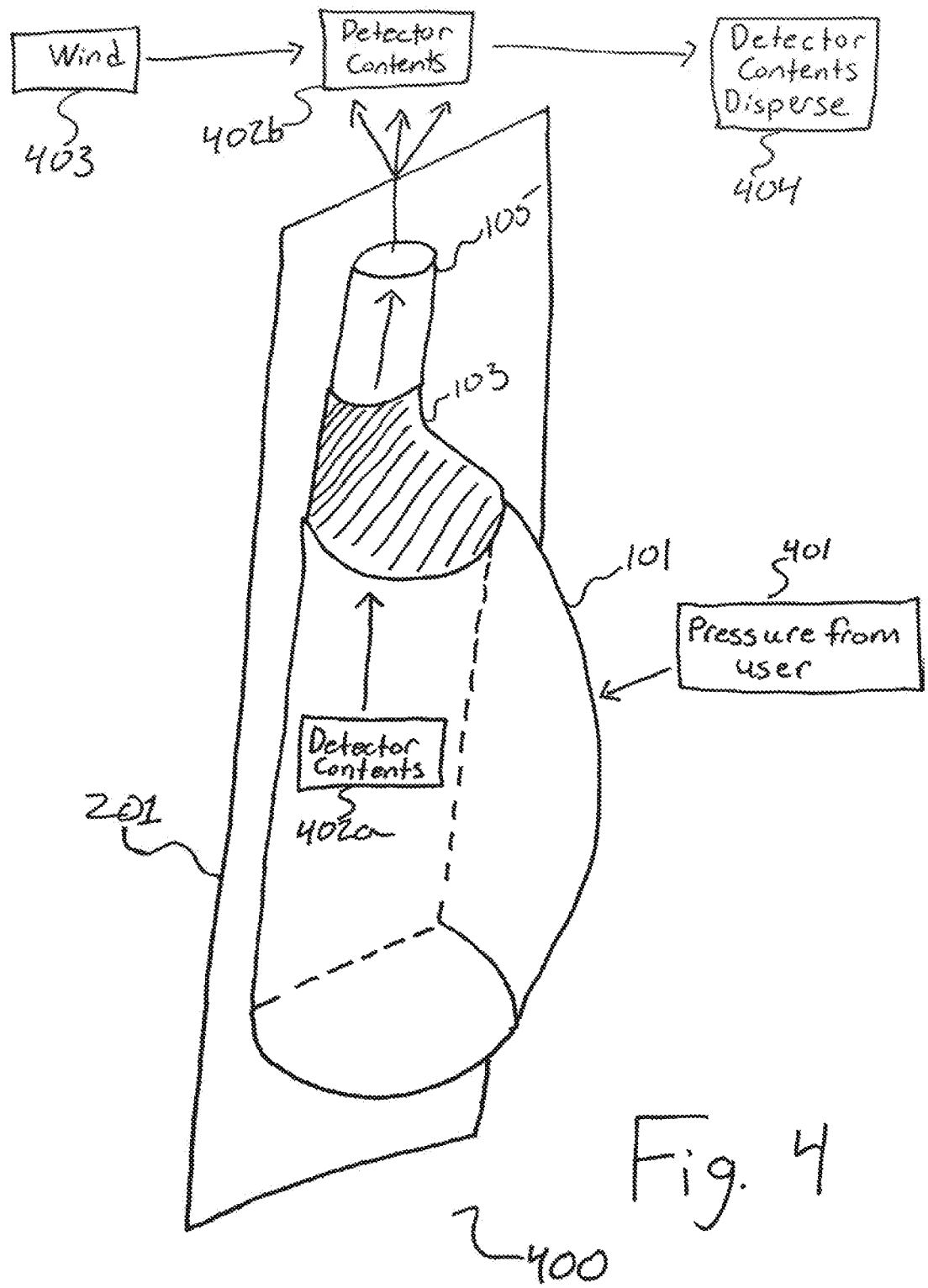
FIG. 4 is an illustration of an exemplary wind detection device according to a preferred embodiment of the invention, illustrating use of wind detection device attached to surface of a hunting bow.

FIG. 4 is an illustration of an exemplary wind detection device according to a preferred embodiment of the invention, illustrating use 400 of wind detection device attached to surface of a hunting bow. Device 101 attaches to surface of hunting bow 201 via an adhesive placed between bisected flat surface of device 101 and surface of hunting bow 201. Detector contents 402a such as talcum powder are contained within device 101. User of device 101 such as a hunter, may apply pressure 401 to device 101 walls that are not attached to surface of hunting bow 201. The pressure 401 from user pushes device 101 walls in towards the bisected wall, thereby squeezing detector contents 402a within device 101. Detector contents 402a move from the applied pressure 401 of device 101 walls and move upwards through lid 103 and continue upward through mouth 105 of device 101. Once outside of device 101, detector contents 402b may then be subjected to wind 403; wind 403 pushes detector contents 402b along wind 403 path and thereby disperses detector contents 404. According to how detector contents 402b are dispersed 404, hunter will have a notion of which way their scent is floating with the wind 403 and will be able to make more accurate decisions regarding hunting. If there is little to no wind 403, detector contents 402b may disperse 404 by falling to the ground, hanging in the air, or gently floating around or away.

FIGS. 5A-5C are illustrations of a preferred embodiment having a circular frontal cross-section, an ovular side cross-section, and showing a mounting structure and mounting receiver. FIG. 5A shows a side view of the embodiment 500. In some embodiments, the mounting structure is removable from the enclosure, and in other embodiments, the mounting structure is permanently attached to the enclosure. In some embodiments, the mounting structure and enclosure are molded as a single piece. In this embodiment, an enclosure 501 with an interior cavity 506 has an oval shaped cross section when viewed from the side. An opening 502 at the top of the enclosure 501 allows access into the interior cavity 506 in order to fill at least a portion of the interior cavity 506 with a fine particulate substance such as talcum powder or chalk powder. When dispensed, the fine particulate substance disperses into the air, thus indicating the wind direction. In some embodiments, instead of a fine particular substance, the cavity may be filled in whole or in part by a liquid which, when dispensed, disperses as a vapor, thus indicating the wind direction. After the interior cavity 506 is filled with a particular substance, a dispensing tube 503, shown here inside the interior cavity 506, is inserted through the opening 502. The dispensing tube 503 has an opening at both ends, and a longitudinal hole running the length of the tube that connects the openings as both ends. The dispensing tube 503 is held in place by friction against the opening 502, or by grooves, ridges, tabs, or other means, such that the opening at one end of the dispensing tube 503 is inside the interior cavity 506, and the opening at the other end of the dispensing tube 503 is open to the environment outside of the enclosure 501. A mounting structure 504 is permanently affixed to the enclosure 501. A mounting receiver 507 is configured to be attached to an object. The mounting structure 504 is configured to be removably attached to a mounting receiver 507. In this embodiment, the mounting receiver 507 is affixed to an object using an adhesive 505. The mounting structure 504 is a magnet mounted in one polarity and the mounting receiver 507 is a magnet mounted in the opposite polarity, such that the mounting structure 504 and mounting receiver 507 are attracted to one-another my magnetic attraction when placed together, holding the device in place on the object. FIG. 5B shows a top view of the same embodiment. FIG. 5C shows a front view of the same embodiment. In some embodiments, the dispensing tube is removable, and in other embodiments, the dispensing tube is permanently attached and non-removable. In some embodiments, the dispensing tube, opening, and enclosure are molded as a single piece.

Figure 6:
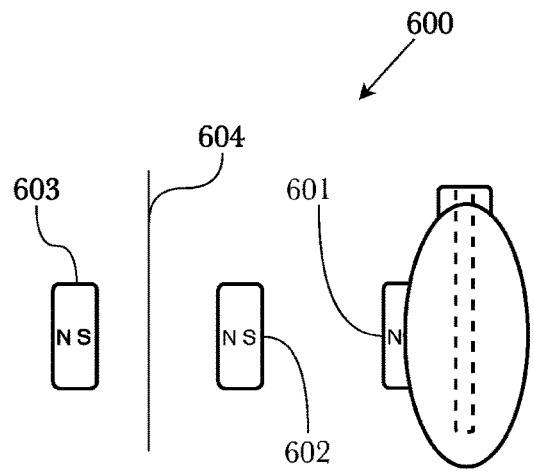
FIG. 6 shows an aspect in which the device is attached through a thin object such as a hat or piece of clothing using magnets.

FIGS. 6-10 are illustrations of variations of the mounting structure and mounting receiver aspect. FIG. 6 shows an aspect 600 in which the device is attached through a thin object such as a hat or piece of clothing using magnets. The mounting structure 601 is a magnet of one polarity. The mounting receiver 602 is a magnet of the opposite polarity (i.e., the magnetic polarity of the face of the mounting receiver 602 is of the opposite polarity to the face of the mounting structure 601, such that the two faces are attracted by magnetic attraction). A third magnet 603 placed behind a thin object 604 is of the opposite polarity to the magnet of the mounting receiver 602, such that the third magnet 603 and the mounting receiver 602 are held together by magnetic attraction through the thin object 604 and the device is attached to the mounting receiver 602 by the mounting structure 601, also through magnetic attraction.

An alternative embodiment may be to replace one of the magnets 601, 602 with an object made at least partly of ferrous metal, with the other object being a magnet of the appropriate polarity to pull the at-least-partially ferrous metal object to it, rather than a plurality of magnets.

Figure 7:
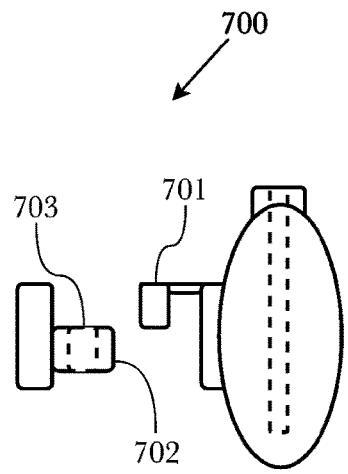
FIG. 7 shows an aspect in which the device is attached by a hook, post, or pin placed into a hole.

FIG. 7 shows an aspect 700 in which the device is attached by a hook, post, or pin placed into a hole. The mounting structure comprises a hook, pin, or post 701. The mounting receiver comprises an extension 702 with a hole 703 into which the hook, pin or post may be inserted. The mounting receiver is attached to an object. The device is attached to the mounting receiver by inserting the hook, pin, or post 701 into the hole 703 in the mounting receiver 702.

Figure 8:
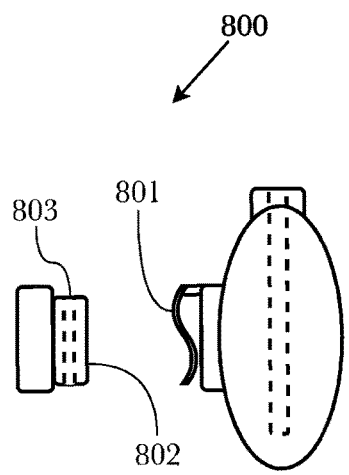
FIG. 8 shows an aspect in which the device is attached by a clip placed into a slot.

FIG. 8 shows an aspect 800 in which the device is attached by a clip placed into a slot. The mounting structure comprises a clip 801. The mounting receiver comprises an extension 802 with a slot 803 into which the clip may be inserted. The mounting receiver is attached to an object. The device is attached to the mounting receiver by inserting the clip 801 into the hole 803 in the mounting receiver 802.

Figure 9:
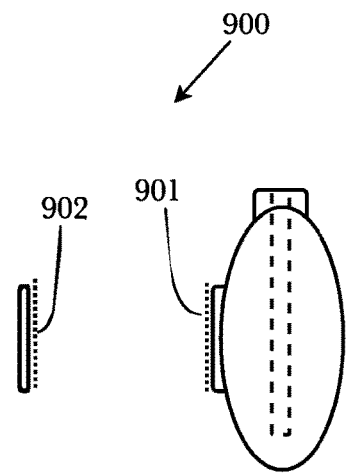
FIG. 9 shows an aspect in which the device is attached by a hook and loop fastener (commonly known as velcro, and often associated with the brand name Velcro™).

FIG. 9 shows an aspect 900 in which the device is attached by a hook and loop fastener (commonly known as velcro, and often associated with the brand name Velcro™). The mounting structure comprises one component 901 of a hook and loop fabric (e.g., the scratchy "hook" side of the hook and loop fabric), and the mounting receiver comprises the other component 902 of a hook and loop fabric (e.g., the fuzzy "loop" side of the hook and loop fabric). The mounting receiver is attached to an object. The device is attached to the mounting receiver by pressing the two components 901 and 902 of the hook and loop fabric together such that they cling to one another.

Figure 10:
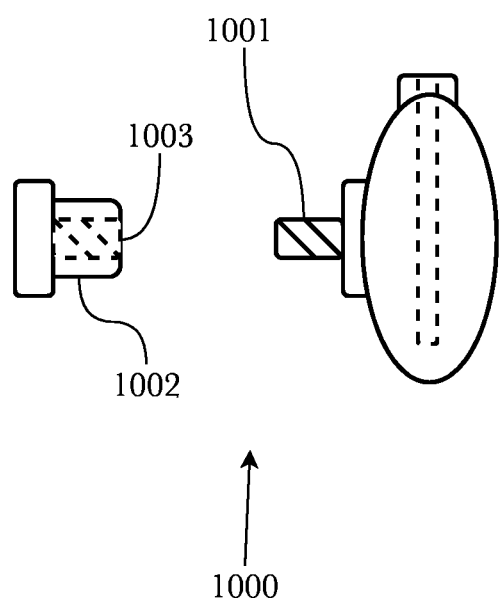
FIG. 10 shows an aspect in which the device is attached by a threaded screw mechanism.

FIG. 10 shows an aspect 1000 in which the device is attached by a threaded screw mechanism. The mounting structure comprises a threaded male screw extension 1001. The mounting receiver comprises an extension 1002 with a female threaded screw opening 1003 into which the threaded male screw extension 1001 may be screwed. The mounting receiver is attached to an object. The device is attached to the mounting receiver by screwing the threaded male screw extension 1001 into the threaded female screw opening 1003 in the mounting receiver extension 1002.

It should be noted that in all of the aspects described above showing the mounting structure comprising one component of a fastening system and the mounting receiving comprising the corresponding component (e.g., male component on mounting structure/female component on mounting receiver), the reverse of each such aspect is covered by this application (e.g., female component on mounting structure/male component on mounting receiver).

The skilled person will be aware of a range of possible modifications of the various embodiments described above. Accordingly, the present invention is defined by the claims and their equivalents.

What is claimed is:

1. A wind detection device, comprising:
    an enclosure comprising an interior cavity, a flexible wall, and a mounting structure, the mounting structure comprising a male hook, pin, post, or extension;

a dispensing tube inserted into and retained in the enclosure, the dispensing tube having a first and a second end and comprising a longitudinal hole extending the length of the dispensing tube from the first end to the second end; and a mounting receiver comprising an adhesive surface and a female hole or opening, wherein the mounting receiver is configured to be attached to an object by means of the adhesive surface, and configured to receive and hold the mounting structure of the enclosure by means of insertion of the male hook, pin, post, or extension into the female hole or opening;

wherein, when a particulate substance is contained within the interior cavity, pressure on the exterior of the enclosure causes air in the interior cavity to be compressed, forcing a mixture of air and particulate matter from the interior cavity into the first end of the dispensing tube and out of the second end of the dispensing tube.

2. A wind detection device, comprising:

an enclosure comprising an interior cavity, a flexible wall, and a mounting structure, the mounting structure comprising a female hole or opening;

a dispensing tube inserted into and retained in the enclosure, the dispensing tube having a first and a second end and comprising a longitudinal hole extending the length of the dispensing tube from the first end to the second end; and a mounting receiver comprising an adhesive surface and a male hook, pin, post, or extension, wherein the mounting receiver is configured to be attached to an object by means of the adhesive surface, and configured to receive and hold the mounting structure of the enclosure by means of insertion of the male hook, pin, post, or extension into the female hole or opening;

wherein, when a particulate substance is contained within the interior cavity, pressure on the exterior of the enclosure causes air in the interior cavity to be compressed, forcing a mixture of air and particulate matter from the interior cavity into the first end of the dispensing tube and out of the second end of the dispensing tube.

* * * * *